United States Patent
Long et al.

(10) Patent No.: US 12,147,066 B2
(45) Date of Patent: Nov. 19, 2024

(54) OPTICAL STACK INCLUDING MULTILAYER OPTICAL FILM AND RADIO-WAVE ANTI-REFLECTION SHEET

(71) Applicant: 3M INNOVATIVE PROPERTIES COMPANY, St. Paul, MN (US)

(72) Inventors: Fan Long, Panyu District (CN); Bharat R. Acharya, Woodbury, MN (US); Jaewon Kim, Woodbury, MN (US); Jingfei Chen, Shanghai (CN); Huijie Xie, Beijing (CN); Zhe Hu, Suzhou (CN)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/567,823

(22) PCT Filed: Jun. 28, 2021

(86) PCT No.: PCT/CN2021/102717
§ 371 (c)(1),
(2) Date: Dec. 7, 2023

(87) PCT Pub. No.: WO2023/272428
PCT Pub. Date: Jan. 5, 2023

(65) Prior Publication Data
US 2024/0264347 A1 Aug. 8, 2024

(51) Int. Cl.
*G02B 5/26* (2006.01)
*G01S 7/03* (2006.01)
(Continued)

(52) U.S. Cl.
CPC .................. *G02B 5/26* (2013.01); *G01S 7/03* (2013.01); *G01S 13/931* (2013.01); *G02B 1/04* (2013.01);
(Continued)

(58) Field of Classification Search
CPC .......... H01Q 1/42; H01Q 1/422; H01Q 1/424; H01Q 1/425; H01Q 15/00; H01Q 15/0006;
(Continued)

(56) References Cited

U.S. PATENT DOCUMENTS

| | | |
|---|---|---|
| 5,103,337 A | 4/1992 | Schrenk et al. |
| 5,540,978 A | 7/1996 | Schrenk |

(Continued)

FOREIGN PATENT DOCUMENTS

| | | |
|---|---|---|
| CN | 201833636 U | 5/2011 |
| CN | 102099203 B | 1/2013 |

(Continued)

OTHER PUBLICATIONS

International Search Report for PCT International Application No. PCT/CN2021/102717, mailed on Mar. 7, 2022, 5 pages.

*Primary Examiner* — Stephone B Allen
*Assistant Examiner* — Adam W Booher
(74) *Attorney, Agent, or Firm* — Clifton F. Richardson

(57) ABSTRACT

An optical stack (100) includes a substrate (110), a radio-wave anti-reflection sheet (130) configured to reduce reflection from the optical stack (100) of radio waves at a predetermined operating frequency (f), and a visible light reflective, infrared light transmissive multilayer optical film (120) disposed between the radio-wave anti-reflection sheet (130) and the substrate (110). For radiation substantially normally incident on the radio-wave anti-reflection sheet (130) and for a first frequency range at least 20 GHZ wide, centered on the predetermined operating frequency (f), and disposed between about 1 GHZ and about 120 GHZ, a return loss of the optical stack (100) is asymmetric about the predetermined operating frequency (f) in the first frequency range. The optical stack (100) has a largest return loss S11L (Continued)

in the first frequency range of less than −10 dB and a difference between the largest return loss S11L and a smallest return loss S11S in the first frequency range is less than about 2 dB.

20 Claims, 13 Drawing Sheets

(51) Int. Cl.
    *G01S 13/931* (2020.01)
    *G02B 1/04* (2006.01)
    *G02B 5/20* (2006.01)
    *G02B 5/30* (2006.01)
    *H01Q 1/42* (2006.01)

(52) U.S. Cl.
    CPC ............ *G02B 5/208* (2013.01); *G02B 5/3008* (2013.01); *H01Q 1/422* (2013.01)

(58) Field of Classification Search
    CPC ........... H01Q 15/0013; H01Q 15/0026; H01Q 15/006; G02B 5/26; G02B 5/208; G02B 5/3008; G02B 5/28; G02B 5/281; G02B 5/285; G02B 5/30; G02B 5/3025; G02B 5/3033; G02B 5/3041; G02B 5/305; G01B 1/04; G01S 7/03; G01S 13/931
    See application file for complete search history.

(56) References Cited

U.S. PATENT DOCUMENTS

| | | | |
|---|---|---|---|
| 5,882,774 A | 3/1999 | Jonza et al. | |
| 6,179,948 B1 | 1/2001 | Merrill et al. | |
| 6,207,260 B1 | 3/2001 | Wheatley et al. | |
| 6,783,349 B2 | 8/2004 | Neavin et al. | |
| 6,859,323 B1 | 2/2005 | Gasloli et al. | |
| 6,967,778 B1 | 11/2005 | Wheatley et al. | |
| 7,722,713 B2 | 5/2010 | Green et al. | |
| 8,354,171 B2 | 1/2013 | Manabe et al. | |
| 9,162,406 B2 | 10/2015 | Neavin et al. | |
| 2006/0257760 A1 | 11/2006 | Mori et al. | |
| 2011/0297087 A1 | 12/2011 | Pagani | |
| 2012/0003489 A1 | 1/2012 | Ying | |
| 2012/0038990 A1 | 2/2012 | Hao et al. | |
| 2013/0011608 A1 | 1/2013 | Wolk et al. | |
| 2013/0034693 A1 | 2/2013 | Fujii et al. | |
| 2013/0235614 A1 | 9/2013 | Wolk et al. | |
| 2017/0259754 A1 | 9/2017 | Gong | |
| 2020/0072947 A1* | 3/2020 | Miu | G01S 17/931 |
| 2021/0333455 A1 | 10/2021 | Fabick et al. | |

FOREIGN PATENT DOCUMENTS

| | | |
|---|---|---|
| CN | 112673290 A | 4/2021 |
| EP | 2372387 A1 | 10/2011 |
| EP | 2409832 A1 | 1/2012 |
| JP | 2011068081 A | 4/2011 |
| JP | 2011079178 A | 4/2011 |
| JP | 2011093296 A | 5/2011 |
| JP | 2011167969 A | 9/2011 |
| JP | 2011218776 A | 11/2011 |
| WO | 2011128973 A1 | 10/2011 |
| WO | 2012057072 A1 | 5/2012 |
| WO | 2012096512 A2 | 7/2012 |
| WO | 2012133234 A1 | 10/2012 |
| WO | 2012139280 A1 | 10/2012 |
| WO | 2020053832 A1 | 3/2020 |
| WO | 2020225717 A1 | 11/2020 |
| WO | 2020234801 A1 | 11/2020 |
| WO | 2020234808 A1 | 11/2020 |
| WO | 2021116849 A1 | 6/2021 |
| WO | 2021224799 A1 | 11/2021 |

* cited by examiner

OPTICAL STACK INCLUDING MULTILAYER OPTICAL FILM AND RADIO-WAVE ANTI-REFLECTION SHEET

CROSS REFERENCE TO RELATED APPLICATIONS

This application is a national stage filing under 35 U.S.C. 371 of PCT/CN2021/102717, filed Jun. 28, 2021, the disclosure of which is incorporated by reference in its entirety herein.

BACKGROUND

Efforts to equip automobiles with radar devices are advancing in order to improve automotive safety and further advance towards practical applications of automated driving.

SUMMARY

In some aspects, the present description provides an optical stack including a substrate; a radio-wave anti-reflection sheet configured to reduce reflection from the optical stack of radio waves emitted from a transmitter at a predetermined operating frequency; and a multilayer optical film disposed between the radio-wave anti-reflection sheet and the substrate, such that for light substantially normally incident on the multilayer optical film and for at least one polarization state: an average optical reflectance of the multilayer optical film may be greater than about 70% in a first wavelength range of about 420 nm to about 680 nm; and an average optical transmittance of the multilayer optical film may be greater than about 70% in a second wavelength range at least about 100 nm wide and disposed between about 800 nm and about 1600 nm. For radiation substantially normally incident on the radio-wave anti-reflection sheet such that at least a portion of the radiation is transmitted through each of the radio-wave anti-reflection sheet, the multilayer optical film, and the substrate; and for a first frequency range at least 20 GHz wide, centered on the predetermined operating frequency, and disposed between about 1 GHz and about 120 GHz: a return loss of the optical stack is asymmetric about the predetermined operating frequency in the first frequency range; and the optical stack has a largest return loss S11L in the first frequency range of less than −10 dB and a difference between the largest return loss S11L and a smallest return loss S11S in the first frequency range is less than about 2 dB.

In some aspects, the present description provides an optical stack including a substrate; a radio-wave anti-reflection sheet configured to reduce reflection from the optical stack of radio waves emitted from a transmitter at a predetermined operating frequency; and a multilayer optical film disposed between the radio-wave anti-reflection sheet and the substrate, such that for light substantially normally incident on the multilayer optical film and for at least one polarization state: an average optical reflectance of the multilayer optical film may be greater than about 70% in a first wavelength range of about 420 nm to about 680 nm; and an average optical transmittance of the multilayer optical film may be greater than about 70% in a second wavelength range at least about 100 nm wide and disposed between about 800 nm and about 1600 nm. For radiation substantially normally incident on the radio-wave anti-reflection sheet such that at least a portion of the radiation is transmitted through each of the radio-wave anti-reflection sheet, the multilayer optical film, and the substrate: for a first frequency range from f1 to f2, 1 GHz≤f1<f2≤120 GHz, the predetermined operating frequency being an average of f1 and f2, a return loss of the optical stack is asymmetric about the predetermined operating frequency in the first frequency range, and the optical stack has a largest return loss S11L in the first frequency range of less than −10 dB and a difference between the largest return loss S11L and a smallest return loss S11S in the first frequency range is less than about 2 dB; and for each of a second frequency range of about 0.1 f1 to f1 and a third frequency range of f2 to about 3 f2, the return loss of the optical stack has a least one peak and at least one valley, where the at least one peak has a first local maximum greater than S11L+2 dB at a frequency fp1, the at least one valley has a first local minimum less than S11S−2 dB at a frequency fv1, and $f2-f1 \geq |fp1-fv1|$.

These and other aspects will be apparent from the following detailed description. In no event, however, should this brief summary be construed to limit the claimable subject matter.

DETAILED DESCRIPTION

Figure 1:
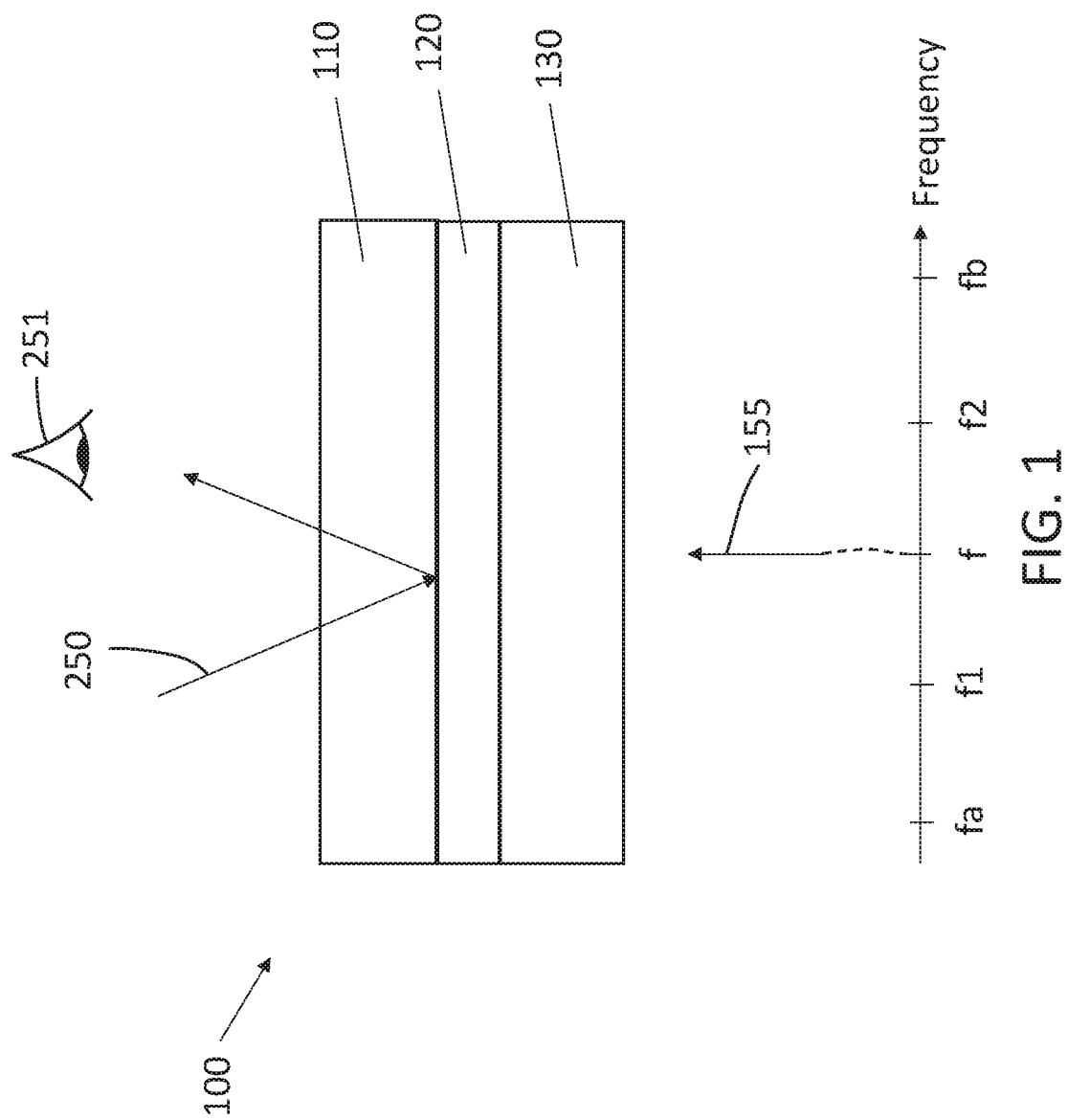
FIGS. 1-4 are schematic cross-sectional views of optical stacks, according to some embodiments.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

It is typically desired for radar devices mounted in automobiles to detect not only four-wheeled vehicles and larger commercial vehicles in the surrounding area, but also pedestrians and compact vehicles such as two-wheeled vehicles. However, reflected waves from a human body or compact vehicles are typically weak, and therefore when a radar device is provided inside a radome or cover member (e.g., a cover portion of a body portion of a vehicle member that may include an accommodation chamber in which the radar device can be installed), it tends to be difficult to detect a human body or compact vehicles, for example, with high accuracy due to waves reflected by the cover member, for example. Therefore, in order to detect weak reflected waves from a human body or compact vehicles, for example, with high accuracy using a radar device provided inside a cover member, it is desirable to suppress the reflected waves from the cover member. Furthermore, it is sometimes desired to place the radar device, and optionally other devices, behind an automobile emblem or logo which may be desired to have a metallic luster or appearance. It may also be desired to include one or more infrared transmitters and/or receivers (e.g., a lidar unit and/or a night vision camera) behind the radome or cover member. However, metal is reflective to both radio waves and infrared light and may substantially interfere with the functioning of radar and other devices disposed under a metal-containing cover member.

According to some embodiments of the present description, an optical stack that may be used in or as a radome or cover member, that allows transmission of both radio waves and infrared radiation, and that can provide a reflective appearance (e.g., having a metallic appearing luster) is provided. An optical stack is generally a stack of layers that provides optical functionality. An optical stack may also provide other functionalities. The reflective appearance of an optical stack can be provided by including a multilayer optical film in the optical stack that is reflective in a visible wavelength range, and transmissive in both a near infrared wavelength range and a radio frequency range. The multilayer optical film may be a polymeric multilayer optical film and the optical stack may be free of metal or substantially free of metal (e.g., free of metal that that significantly interferes with the transmission of near infrared light or radio-waves). The optical stack can include a radio-wave anti-reflection sheet to reduce reflection of a radar signal from the optical stack. The radio-wave anti-reflection sheet can be configured to provide a reduce reflection by an approximately constant amount of at least 10 dB throughout a first frequency range centered on a predetermined operating frequency of the radar device. The first frequency range can be at least about 20 GHz wide and/or can be wider than a frequency difference between adjacent peaks and valley in the reflection from the optical stack in frequency ranges on each side of the first frequency range.

FIG. 1 is a schematic cross-sectional view of an optical stack 100 including a substrate 110, a radio-wave anti-reflection sheet 130, and a multilayer optical film 120 disposed between the radio-wave anti-reflection sheet 130 and the substrate 110, according to some embodiments. The optical stack 100 may be configured to reflect a visible light 250 toward a viewer 251. For example, the optical stack 100 may be used in a vehicle assembly as a cover for a radar transmitter where the multilayer optical film 120 provides a high reflectivity to produce a metallic luster, for example, without substantially interfering with the transmission of radio waves from the radar transmitter. As described further elsewhere herein, the optical stack 100 may be configured to display a logo or emblem to the viewer 251. The radio-wave anti-reflection sheet 130 can be configured to reduce reflection from the optical stack 100 of radio waves 155 emitted from a transmitter (see, e.g., transmitter 210 schematically illustrated in FIG. 6) at a predetermined operating frequency f. The predetermined operating frequency may be disposed in a first frequency range from f1 to f2 and may be an average (mean) of f1 and f2. The first frequency range (f1 to f2) can be at least 20 GHz wide, centered on the predetermined operating frequency f, and disposed between fa and fb. As described further elsewhere herein, the optical stack may have a return loss that is approximately constant in the frequency range f1 to f2 and substantially varying in one or both of the frequency ranges fa to f1 and f2 to fb. The frequency f1 may be at least 1 GHz, or at least 2 GHz, or at least 5 GHz, or at least 10 GHz, or at least 20 GHz, or at least 40 GHz, for example. The frequency f2 may be no more than 120 GHz, or no more than 110 GHz, or no more than 100 GHz, for example. The frequency fa may be about 0.05 GHz or about 0.1 GHz, or about 0.5 GHz, for example, and/or may be about 0.1 f1 or about 0.2 f1, for example. The frequency fb may be about 500 GHz, or about 360 GHz, or about 300 GHz, for example, and/or may be about 3 f2 or about 2 f2, for example.

Figure 2:
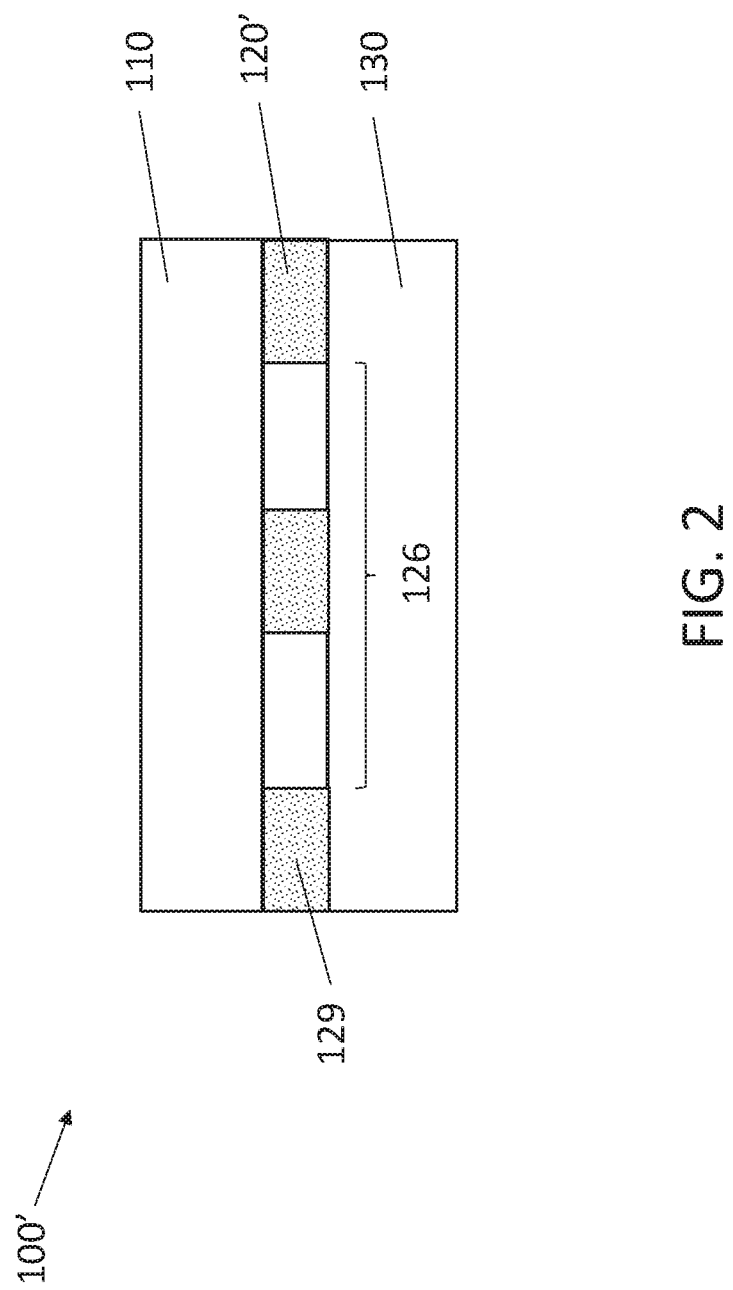

FIG. 2 is a schematic cross-sectional view of an optical stack 100', according to some embodiments, which may correspond to optical stack 100 except that the multilayer optical film 120' includes a printed pattern 126 which may define, for example, a logo or an emblem. For example, the multilayer optical film 120' can be printed with ink 129 to define the printed pattern 126. The ink 129 may be optically absorptive for visible light and optically transmissive for infrared (IR) light (e.g., optically transmissive in the second wavelength range of λ3 to λ4 described elsewhere herein). Suitable IR transmissive inks are available from Teikoku Printing Inks Mfg. Co., Ltd. (Arakawa-ku, Japan), for example.

Figure 3:
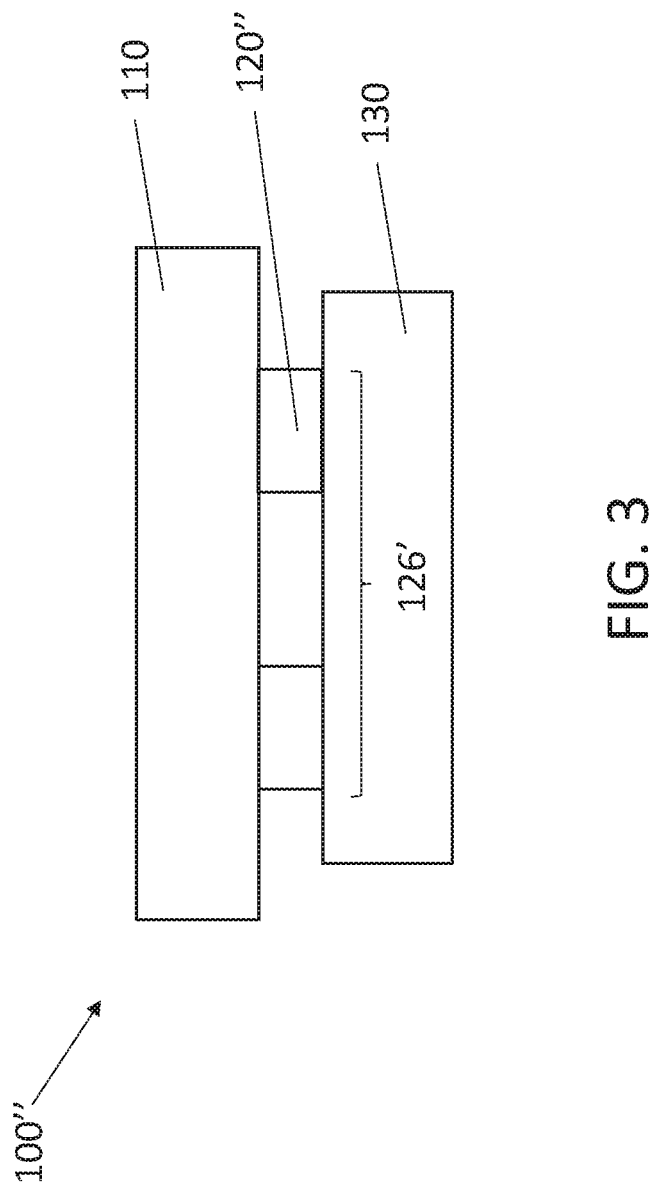

FIG. 3 is a schematic cross-sectional view of an optical stack 100", according to some embodiments, which may correspond to optical stack 100 except that the multilayer optical film 120" is patterned (e.g., to define a logo or emblem 126') and the multilayer optical film 120" and the radio-wave anti-reflection sheet 130 may not be coextensive with the substrate 110. A continuous film can be die-cut, for example, to remove portions of the continuous film resulting in a patterned film.

In some embodiments, the multilayer optical film 120, 120' is substantially coextensive with at least one of the substrate 110 or the radio-wave anti-reflection sheet 130. In FIGS. 1, 2, 4, and 6, for example, the multilayer optical film is substantially coextensive with each of the substrate and the radio-wave anti-reflection sheet. In some embodiments, as schematically illustrated in FIG. 3, for example, the multilayer optical film 120" is coextensive with only a portion of the substrate 110 and/or with only a portion of the radio-wave anti-reflection sheet 130. In some embodiments, the multilayer optical film and the radio-wave anti-reflection sheet may be substantially coextensive with one another, but not with the substrate (e.g., the multilayer optical film and the radio-wave anti-reflection sheet may cover only a portion of the substrate). Layers or elements can be described as substantially coextensive with each other if at least about 60% by area of each layer or element is coextensive with at least about 60% by area of each other layer or element. In some embodiments, for layers or elements describes as substantially coextensive, at least about 70%, or at least about 80%, or at least about 90% by area of each layer or element is coextensive with at least about 70%, or at least about 80%, or at least about 90% by area of each other layer or element.

Figure 4:
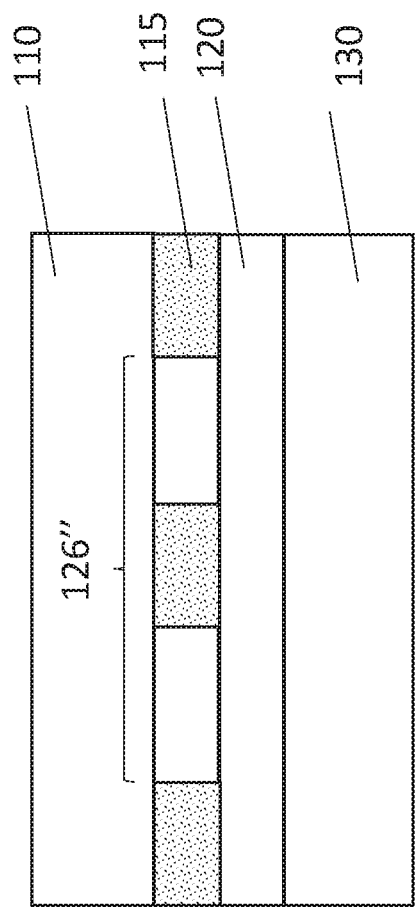

FIG. 4 is a schematic cross-sectional view of an optical stack 100''', according to some embodiments, which may correspond to optical stack 100 except that an optically absorptive layer 115 is disposed between the substrate 110 and the multilayer optical film 120. In the illustrated embodiment, the optically absorptive layer 115 is patterned to define a logo or emblem 126″. In other embodiments, an optically absorptive layer 115 (or 115′ schematically illustrated in FIG. 6) may be unpatterned. The optically absorptive layer 115, 115′ may provide a desired color while the multilayer optical film 120 provides a desired reflectance or luster. For example, the combination of the optically absorptive layer 115, 115′ and the multilayer optical film 120 can produce a colored mirror or a black mirror effect. The optically absorptive layer 115, 115′ may include dye(s) and/or pigment(s) dispersed in a polymeric binder, for example. Suitable optically absorptive materials include carbon black dispersed in a polymer as described in U.S. Pat. No. 7,722,713 (Green et al.), for example.

Figure 5:
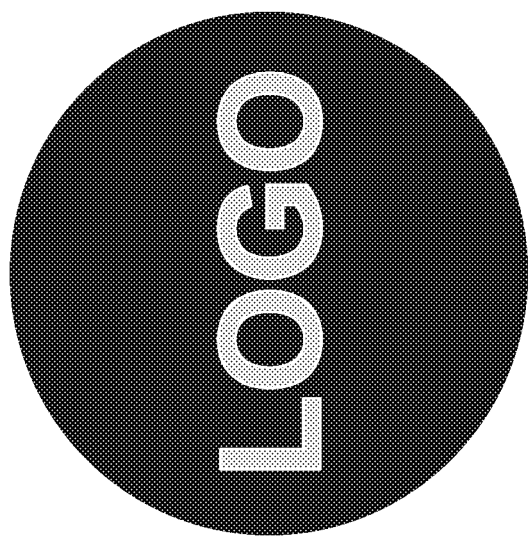
FIG. 5 is a schematic top view of an emblem or logo that may be provided by an optical stack, according to some embodiments.

FIG. 5 is a schematic top view of an emblem or logo 264 that may be provided by the optical stack, according to some embodiments.

Figure 6:
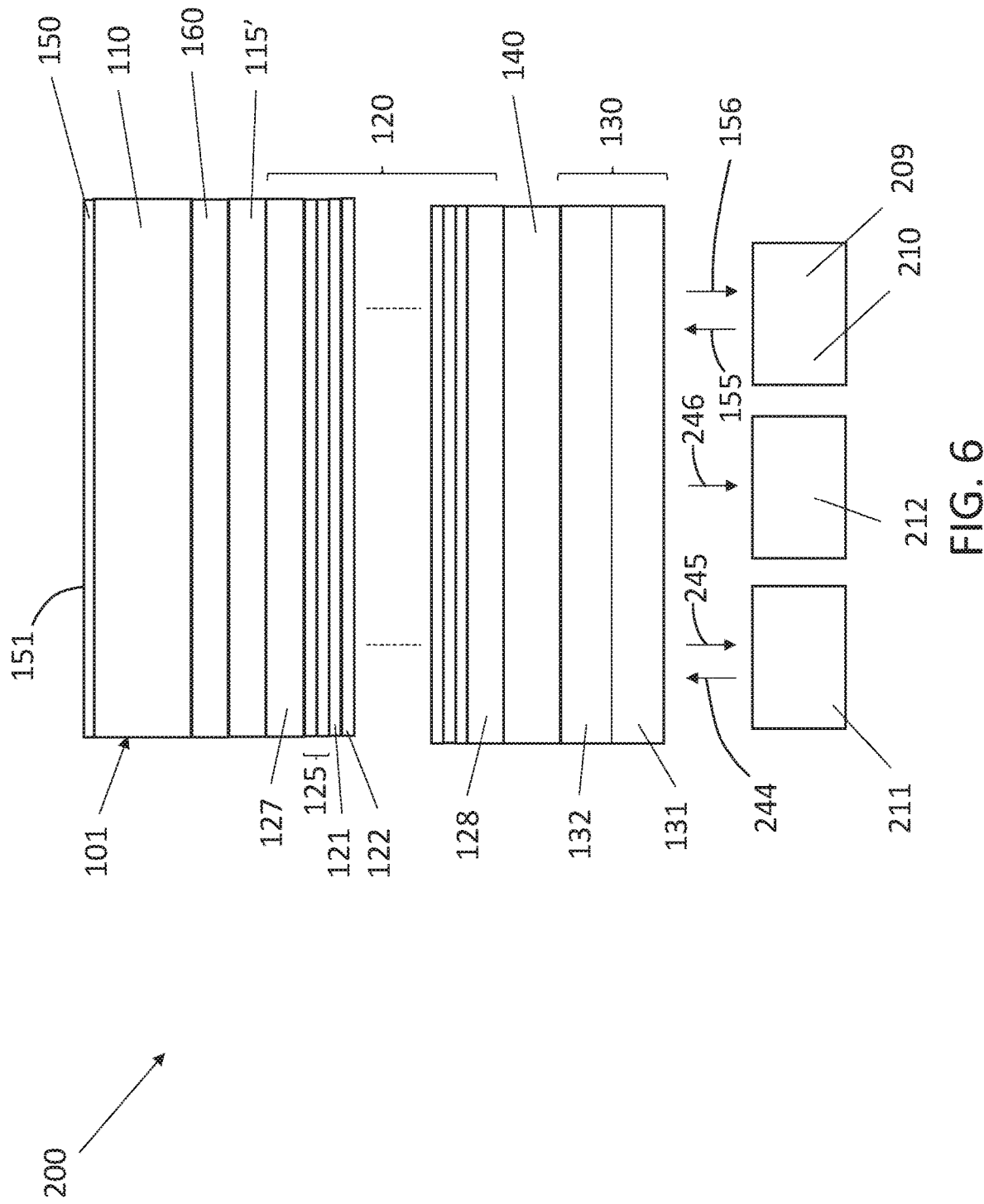
FIG. 6 is a schematic cross-sectional view of a vehicle assembly, according to some embodiments.

FIG. 6 is a schematic cross-sectional view of a vehicle assembly 200, according to some embodiments. The vehicle assembly 200 includes an optical stack 101, which may correspond to any of optical stacks 100, 100′, 100″, or 100‴, for example. The vehicle assembly 200 includes a transmitter 210 and the optical stack 101 disposed proximate the transmitter with the radio-wave anti-reflection sheet 130 facing the transmitter 210. The transmitter can be configured to transmit radio waves 155 at the predetermined operating frequency f. A radar unit 209 may include the transmitter 210 and may be configured to receive radio waves 156 at the predetermined operating frequency f (e.g., the radar unit 209 can include a receiver for receiving the radio waves 156). The vehicle assembly 200 may further include one or more devices 211, 212 disposed proximate the transmitter 210 facing the optical stack 101 (e.g., an infrared light output and/or input surface of the device 211, 212 can face the optical stack 101) adapted to receive or transmit infrared light 244, 245, 246 for at least one wavelength in an infrared wavelength range (e.g., the second wavelength range of λ3 to λ4 described elsewhere herein). In some embodiments, the one or more devices includes a first device 211 adapted to receive and to transmit infrared light 244, 245 at the at least one wavelength. A device may be said to transmit/receive at the at least one wavelength when the device transmits/receives for at least a first wavelength of the at least one wavelength. The first device 211 may be a lidar (light detection and ranging) device, for example. The one or more devices may include a second device 212 adapted to receive infrared light 246 at the at least one wavelength. The second device 212 may be a night vision camera, for example. The devices 211, 212 may operate at one or more of the wavelengths of about 905 nm, about 940 nm, or about 1550 nm, for example.

The optical stack 101 may include an optically absorptive layer 115′, which may optionally be patterned (see, e.g., optically absorptive layer 115 schematically illustrated in FIG. 4), disposed between the substrate 110 and the multilayer optical film 120. The optically absorptive layer 115′ may be included to provide a desired reflected color as described further elsewhere herein.

The substrate 110 may protect the multilayer optical film 120 and other layers of the optical stack, and may protect the transmitter 210 and devices 211, 212. The optical stack 101 may include a polymeric cover layer 140 disposed between the multilayer optical film 120 and the radio-wave anti-reflection sheet 130. The cover layer 140 may be included to protect the multilayer optical film 120. The cover layer 140 and/or the substrate 110 may be substantially transmissive in each of a visible an infrared wavelength range as described further elsewhere herein. Suitable materials for the substrate 110 and/or for the cover layer 140 include polycarbonate, polymethylmethacrylate (PMMA), and blends thereof, for example.

The optical stack 101 may include a protective film 150 disposed on the substrate 110 opposite the multilayer optical film 120. The protective film 150 may be included to prevent external contaminants (e.g., ice, dirt, debris) from building up on the optical stack. The protective film 150 has a major surface 151 facing away from the substrate 110. In some embodiments, the protective film 150 has a hydrophobic (e.g., advancing water contact angle of at least 100 degrees and a water contact angle hysteresis of less than 40 degrees) or superhydrophobic (e.g., advancing water contact angle of at least 150 degrees and a water contact angle hysteresis of less than 20 degrees) major surface 151 facing away from the substrate. In some embodiments, the protective film has an omniphobic (e.g., hydrophobic and having an advancing hexadecane contact angle of at least 70 degrees) or superomniphobic (e.g., superhydrophobic and having an advancing hexadecane contact angle of at least 90 degrees) major surface 151 facing away from the substrate 110. The protective film 150 may include a plurality of nanostructures and may include a fluorinated polymeric coating conforming or partially conforming to the nanostructures at the major surface 151. Suitable protective films are described in International Appl. Pub. No. WO 2020/225717 (Thompson et al.), for example.

The optical stack 101 may include a heater film 160 disposed between the substrate 110 and the multilayer optical film 120. The heater film 160 may be included for removing ice buildup from the optical stack (e.g., when the protective film 150 is omitted or when there is some ice buildup on the protective film 150), for example. In some embodiments, the heater film 160 includes a carbon nanobud layer. The carbon nanobud layer may be substantially transparent and may be heated by applying a current across the layer. Carbon nanobuds are described in U.S. Pat. No. 8,518,726 (Brown et al.), for example. Suitable heater films including carbon nanobud layers are available from Canatu Oy (Helsinki, Finland), for example. In some embodiments, the heater film 160 includes an infrared absorbing material dispersed in a polymeric matrix where the infrared absorbing material absorbs at least a first predetermined infrared wavelength (e.g., a wavelength that may be in the second wavelength range of λ3 to λ4 described elsewhere herein but that may be different than operating wavelength(s) of the devices 211, 212). Such heater films can be heated by applying infrared radiation (e.g., from a device adjacent the radar unit 209) at the first infrared wavelength. Suitable infrared absorbing materials include infrared absorbing dyes such as those described in U.S. Pat. Appl. Pub. No. 2006/0257760 (Mori et al.), for example.

In some embodiments, the radio-wave anti-reflection sheet includes first and second layers 131 and 132 having respective first and second densities and/or respective first and second relative permittivities at the predetermined operating frequency f. The first and second densities can be different from one another and/or the first and second relative permittivities can be different from one another. In some embodiments, the second layer 132 is disposed between the first layer 131 and the multilayer optical film 120. In some such embodiments, the first density is lower than the second density (e.g., by at least 0.1 g/cm$^3$ or at least 0.2 g/cm$^3$). In some such embodiments or in other embodiments, the first relative permittivity is less than the second relative permittivity (e.g., by at least 0.1, or at least 0.2). In some embodiments, the first density is greater than 0.05 g/cm³ and the second density is greater than the first density and less than 0.9 g/cm³. In some embodiments, the first relative permittivity is greater than 1.05 and the second relative permittivity is greater than the first relative permittivity and less than 2.7. In some embodiments, the first relative permittivity is in a range of about 1.1 to about 1.5 and the second relative permittivity is in a range of about 1.6 to about 2.6, for example. In some embodiments, the first relative permittivity is in a range of about 1.2 to about 1.4 and the second relative permittivity is in a range of about 2 to about 2.3, for example. In some embodiments, the substrate 110 and/or the cover layer 140 has a relative permittivity in a range of about 2.5 to about 3.1 or about 2.6 to about 3 at the predetermined operating frequency f. In some embodiments, each of the first and second layers 131 and 132 has an average thickness in a range of about 0.4 mm to about 1.1 mm, or in a range of about 0.5 mm to about 1 mm, for example. In some embodiments, the substrate 110 and/or the cover layer 140 has an average thickness in a range of about 1.5 mm to about 4 mm, or about 1.8 mm to about 3.5 mm, for example.

In some embodiments, at least one of the first and second layers 131, 132 is or includes a nanovoided polymeric layer including a plurality of interconnected nanovoids. Suitable nanovoided layers are described in U.S. Pat. Appl. Publ. Nos. 2012/0038990 (Hao et al.), 2013/0011608 (Wolk et al.), and 2013/0235614 (Wolk et al.), for example. As described in these references, a nanovoided polymeric layer can be formed by coating a layer containing a polymer or polymerizable material in a solvent and subsequently evaporating the solvent. In some cases, a nanovoided layer is formed using a plurality of coating steps in order to achieve a desired thickness. The concentration of nanovoids can be adjusted by adjusting the amount of solvent used in coating the layer and this can be used to adjust the relative permittivity of the layer.

In some embodiments, at least one of the first and second layers 131 and 132 is or includes a foam layer. A foam layer may include hollow particles (e.g., hollow microspheres) to define cells of the foam layer. In some embodiments, at least one of the first and second layers 131 and 132 is or includes a polymeric layer including a plurality of hollow microspheres dispersed therein. The concentration of hollow microspheres can be adjusted to adjust the relative permittivity of the layer. The hollow microspheres may be glass microspheres or may be formed from expandable microspheres, for example. Suitable glass microspheres include hollow glass bubbles such as those available from 3M Company (St. Paul, MN), for example. Suitable expandable microspheres (which can be expanded by the application of heat in forming the polymeric layer) may include a shell formed from a thermoplastic resin, and a low boiling point liquid hydrocarbon encased in the shell. Suitable expandable microspheres include those available form Kureha Corporation, those available from Matsumoto Yushi-Seiyaku Co., Ltd., and those available from Nouryon under the trade name EXPANCEL. Microspheres are generally spherical and have a diameter less than about 1 mm and typically greater than about 0.5 micrometers. In some embodiments, microspheres have a median particle diameter of 1 to 200 micrometers, or 5 to 150 micrometers, for example.

In some embodiments, the radio-wave anti-reflection sheet 130 includes one layer, two layers, or more than two layers. Additional layers may be included to further reduce and/or flatten the return loss around the predetermined operating frequency. The radio-wave anti-reflection sheet may include up to 5 layers, or up to 4 layers, or up to 3 layers, for example. Each layer may be a nanovoided layer or a foam layer, for example. In some embodiments, the radio-wave anti-reflection sheet 130 includes only two layers.

As is known in the art, multilayer optical films including alternating polymeric layers can be used to provide desired reflection and transmission in desired wavelength ranges by suitable selection of layer thicknesses and refractive index differences. Multilayer optical films and methods of making multilayer optical films are described in U.S. Pat. No. 5,882,774 (Jonza et al.); U.S. Pat. No. 6,179,948 (Merrill et al.), U.S. Pat. No. 6,783,349 (Neavin et al.); U.S. Pat. No. 6,967,778 (Wheatley et al.); and U.S. Pat. No. 9,162,406 (Neavin et al), for example. The alternating polymeric layers typically include alternating high and low index layers which can be described as optical layers that transmit and reflect light primarily by optical interference. The high index layers may be birefringent polymeric layers and the low index layers may be optically isotropic polymeric layers. A multilayer optical film including alternating high and low index layers can be described as including a plurality of optical repeat units where each optical repeat unit includes a high index layer and a low index layer. An optical repeat unit is generally the smallest distinct unit of optical layers that repeats along at least a portion of the thickness direction of the optical film. Each optical repeat unit may include one or more layers in addition to the high and low index layers as described in U.S. Pat. No. 5,103,337 (Schrenk et al.); U.S. Pat. No. 5,540,978 (Schrenk); and U.S. Pat. No. 6,207,260 (Wheatley et al.), for example.

In some embodiments, the multilayer optical film 120, 120', 120" includes a plurality of optical repeat units 125 numbering at least 10 in total, or at least 20 in total, or at least 40 in total, for example. The plurality of optical repeat units may number up to about 500 in total, or up to about 450 in total, or up to about 400 in total, for example. Each of the optical repeat units includes at least individual first and second polymeric layers 121 and 122. Each of the first and second polymeric layers can have an average thickness of less than about 500 nm, or less than about 400 nm, or less than about 350 nm, for example. For each of the first and second polymeric layers, the average thickness may be greater than about 10 nm or greater than about 30 nm, or greater than about 50 nm, for example. In some embodiments, each of the optical repeat units 125 has an average total thickness of less than about 1000 nm, or less than about 900 nm, or less than about 800 nm, and/or may have an average total thickness of greater than about 20 nm, or 60 nm, or 100 nm, for example. Average layer thicknesses or average optical repeat unit thicknesses in the above ranges are typically desired to provide reflection in a desired wavelength range and a number of optical repeat units in the above ranges is typically sufficient to provide a desired reflection strength in the desired wavelength range. In some embodiments, the multilayer optical film includes first and second outermost layers 127 and 128, where the plurality of optical repeat units 125 is disposed between the first and second outermost layers 127 and 128. Each of the first and second outermost layers can have an average thickness of greater than about 1 micrometer or greater than about 2 micrometers. For each of the first and second outermost layers, the average thickness may be less than about 40 micrometers, or less than about 20 micrometers, or less than about 10 micrometers, for example. The multilayer optical film may further include protective boundary layers separating adjacent packets of optical repeat units, as is known in the art. Each protective boundary layer may have a thickness in any of the ranges described for the outermost layers.

Suitable materials for the various layers of the multilayer optical film include, for example, those described in the multilayer optical film references listed elsewhere herein. Example materials include polyethylene naphthalate (PEN), coPEN (copolyethylene naphthalate terephthalate copolymer), polyethylene terephthalate (PET), glycol-modified polyester (e.g., PETG GN071 available from Eastman Chemicals, Knoxville, TN; VM318 PCTG available from Eastman Chemicals, Knoxville, TN), polycarbonates (e.g., MAKROLON 1804 or 2405 available from Eastman Chemicals, Knoxville, TN), polymethyl methacrylate (PMMA), coPMMA (a copolymer of methyl methacrylate and ethyl acrylate), and blend thereof. For example, in some embodiments, the multilayer optical film includes alternating layers of PEN (birefringent high index layers) and PMMA (isotropic low index layers). As another example, in some embodiments, the multilayer optical film includes alternating layers of PET (birefringent high index layers) and coPMMA (isotropic low index layers). As still another example, in some embodiments, the multilayer optical film includes alternating layers of PEN (birefringent high index layers) and a blend (isotropic low index layers) of glycol-modified polyester (PETG and PCTG) and polycarbonate (MAKROLON 1804 and 2405).

The multilayer optical film 120, 120', 120" and/or the optional optically absorptive layer 115, 115', for example, may be characterized by transmission properties in specified wavelength ranges. When the multilayer optical film is patterned or printed, the transmission and reflection properties should be understood to be determined in an unprinted, unremoved portion of the film. Similarly, when the optically absorptive layer is patterned, the transmission and optical absorption properties should be understood to be determined in an unremoved portion of the layer.

Figure 7:
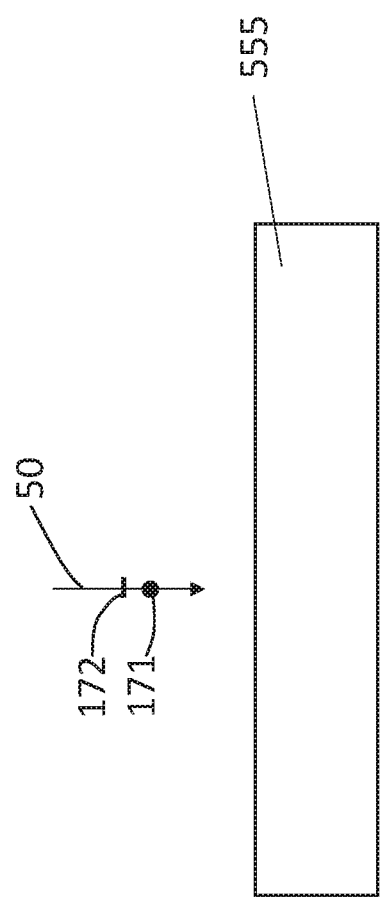
FIG. 7 is a schematic cross-sectional view of light substantially normally incident on an illustrative optical element.

FIG. 7 is a schematic cross-sectional view of light 50 substantially normally incident (e.g., within 20 degrees, or within 10 degrees, or within 5 degrees of normally incident or nominally normally incident) on an optical element 555 which may correspond to the multilayer optical film 120, 120', 120", or the optional optically absorptive layer 115, 115', or the substrate 110, or the radio-wave anti-reflection sheet 130, or the cover layer 140, or the optical stack 100, 100', 100", 100''', for example. Transmission properties may be specified for a first polarization state 171, a second polarization state 172, at least one polarization state (e.g., one or both of polarization states 171 and 172), or for unpolarized light.

Figure 8:
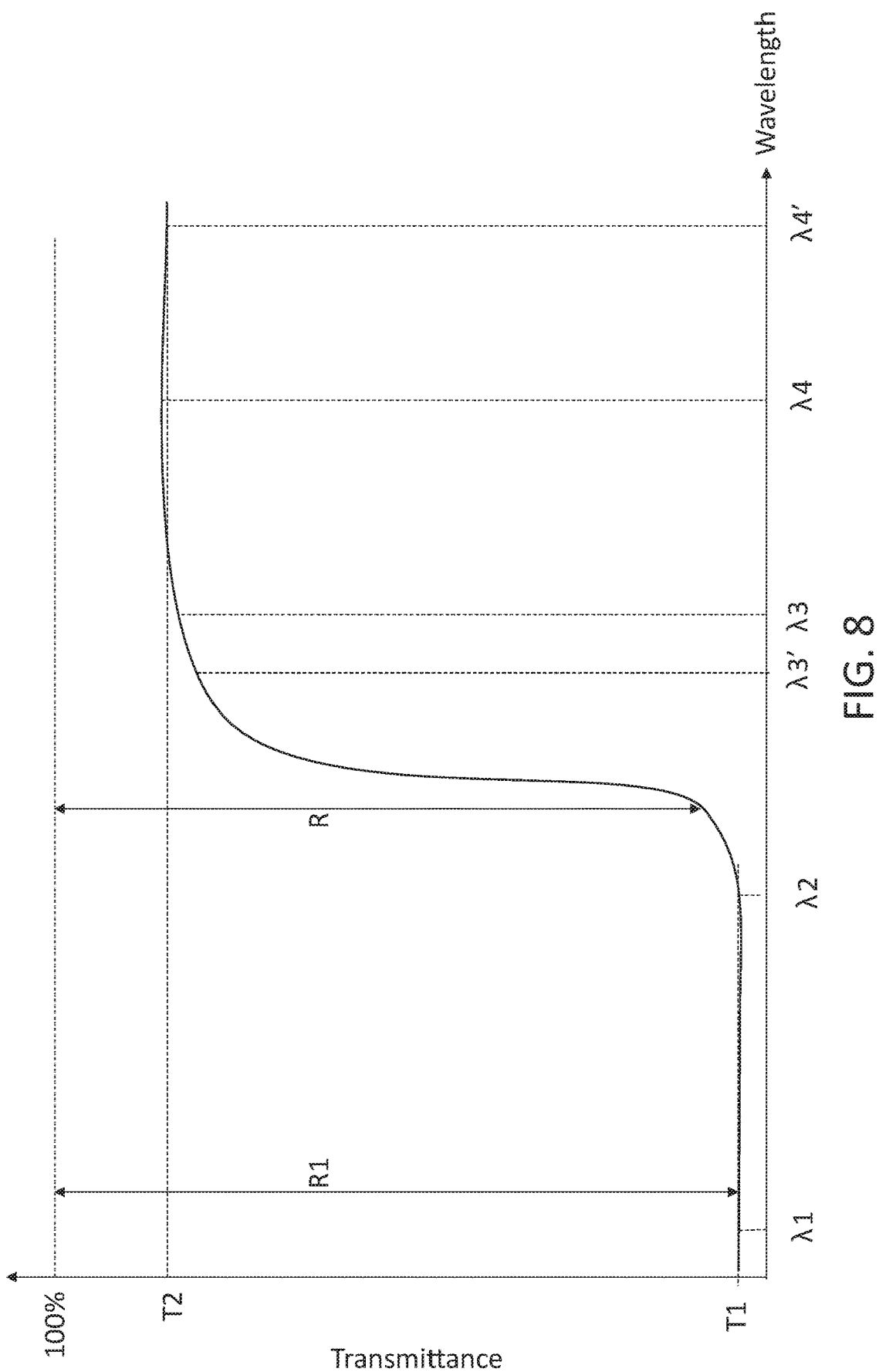
FIG. 8 is a schematic plot of an optical transmittance of an optical element such as a multilayer optical film for substantially normally incident light and for at least one polarization state, according to some embodiments.

FIG. 8 is a schematic plot of an optical transmittance of an optical element (e.g., a multilayer optical film) for substantially normally incident light and for at least one polarization state (e.g., the transmittance can appear as illustrated in FIG. 8 for each of two mutually orthogonal polarization states), according to some embodiments. The optical absorption of the optical element may be negligible so that the optical reflectance R is about 100% minus the optical transmittance. Reflectance and transmittance ranges specified for at least on polarization state may hold for each of two orthogonal polarization states and/or may hold for unpolarized light.

It is typically desired that the multilayer optical film have a high (e.g., greater than about 70%) reflectance in a visible range for at least one polarization state to produce a desired appearance (e.g., a metallic luster) and a high (e.g., greater than about 70%) transmittance in an infrared wavelength for the at least one polarization state so that the multilayer optical film does not substantially interfere with the functioning of the devices 211, 212. In some embodiments, the multilayer optical film 120, 120', 120" is such that for light 50 substantially normally incident on the multilayer optical film and for at least one polarization state (e.g., 171, 172, or 171 and 172): an average optical reflectance (e.g., average optical reflectance R1 which may be about 100% minus the average optical transmittance T1) of the multilayer optical film is greater than about 70% in a first wavelength range of λ1 to λ2; and an average optical transmittance (e.g., average optical transmittance T2) of the multilayer optical film is greater than about 70% in a second wavelength range (λ3 to λ4) at least about 100 nm wide and disposed between λ3' and λ4'. The wavelength λ1 may be about 400 nm, or about 420 nm, or about 450 nm, for example. The wavelength λ2 may be about 700 nm, or about 680 nm, or about 650 nm, for example. The first wavelength range may be from about 420 nm to about 680 nm, for example. The wavelength λ3 or λ3' may be about 750 mu, or about 800 nm, or about 850 nm, or about 890 nm, for example. The wavelength λ4 or λ4' may be about 2000 nm, or about 1600 nm, or about 1200 nm, or about 1000 nm, or about 990 nm, for example. The second wavelength range (λ3 to λ4) may be disposed between about 800 nm and about 1600 nm, for example. The second wavelength range may be from about 850 nm to about 1000 nm, or about 890 to about 990 nm, for example. The average optical reflectance (e.g., R1) of the multilayer optical film in the first wavelength range can be greater than about 80%, or greater than about 85%, or greater than about 90%, for example. The average optical transmittance (e.g., T2) of the multilayer optical film in the second wavelength range can be greater than about 75%, or greater than about 80%, or greater than about 85%, for example.

The optical transmittance can have a sharp band edge (e.g., a best linear fit to the band edge correlating the optical transmittance to the wavelength at least across a wavelength range where the optical transmittance increases from about 10% to about 70% can have a slope of greater than about 3%/nm) between the first and second wavelength ranges. Optical films having sharp band edges are known in the art and are described in U.S. Pat. No. 6,967,778 (Wheatley et al.) and International Appl. Pub. No. WO 2020/053832 (Fabick et al.), for example. Related optical films are described in International Appl. No. PCT/IB2021/053753 filed May 4, 2021.

Various other optical elements may have average optical transmittances in specified ranges in order to provide a desired appearance (e.g., metallic luster) of the optical stack and to allow the devices 211, 212 to function as desired. For example, it is typically desired that the entire optical stack have a sufficient transmittance (e.g., greater than about 20%) in a near infrared wavelength range for the at least one polarization state to allow sufficient infrared light to be transmitted through the optical stack to and/or from the devices 211, 212. In some embodiments, for light 50 substantially normally incident on the radio-wave anti-reflection sheet 130 and for the at least one polarization state, an average optical transmittance of the radio-wave anti-reflection sheet is greater than about 20%, or greater than about 30%, or greater than about 40%, or greater than about 50% in the second wavelength range. In some embodiments, for light 50 substantially normally incident on the optical stack and for the at least one polarization state, an average optical transmittance of the optical stack is greater than about 20%, or greater than about 30%, or greater than about 40%, or greater than about 50% in the second wavelength range. In some embodiments, the substrate 110 has an average optical transmittance for substantially normally incident light 50 in the first wavelength range of greater than about 50%, or greater than about 60%, or greater than about 70%, or greater than about 80%. In some embodiments, the polymeric cover layer 140 has an average optical transmittance for substantially normally incident light in the first wavelength range of greater than about 50%, or greater than about 60%, or greater than about 70%, or greater than about 80%.

The multilayer optical film, and various other layers in the optical stack, can have a transmittance for substantially normally incident radio waves of greater than about 80% or greater than about 90% throughout a frequency range of 0.05 GHz, or 0.1 GHz, or 1 GHz to 160 GHz, or 120 GHz, or 90 GHz, for example, so as to not substantially interfere with the functioning of the radar device 209.

Figure 9:
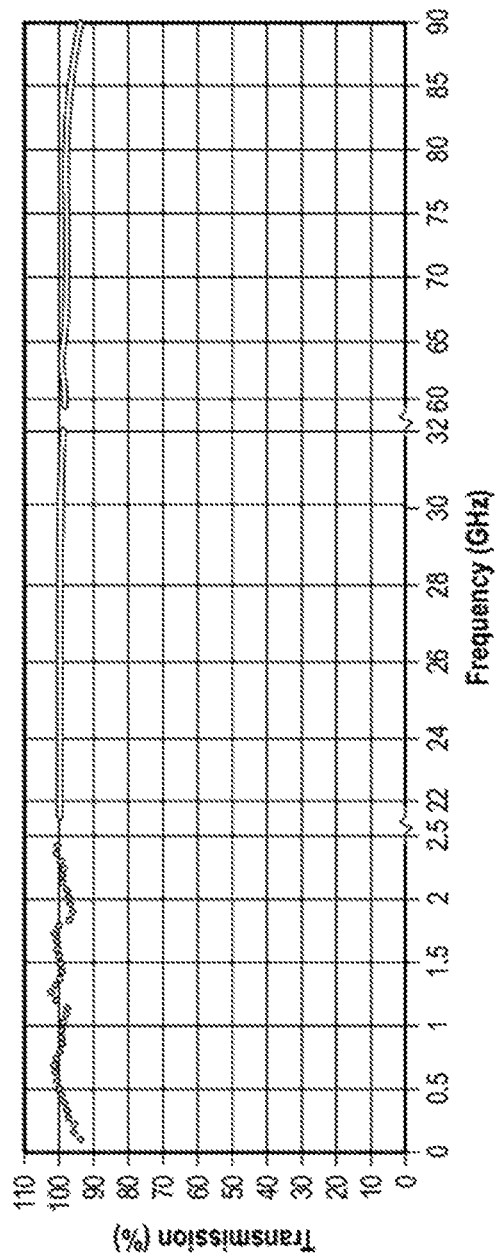
FIG. 9 is a plot of transmission through a multilayer optical film, according to some embodiments.

FIG. 9 is a plot of transmission through a multilayer optical film as a function of frequency, according to some embodiments. The data at low frequencies (below about 2.5 GHz) was determined according to the ASTM D4935-18 test standard. Error in the measurement resulted in some numbers going a little above 100%. The remaining data in the plot were determined using two-port free space measurements.

Figure 10:
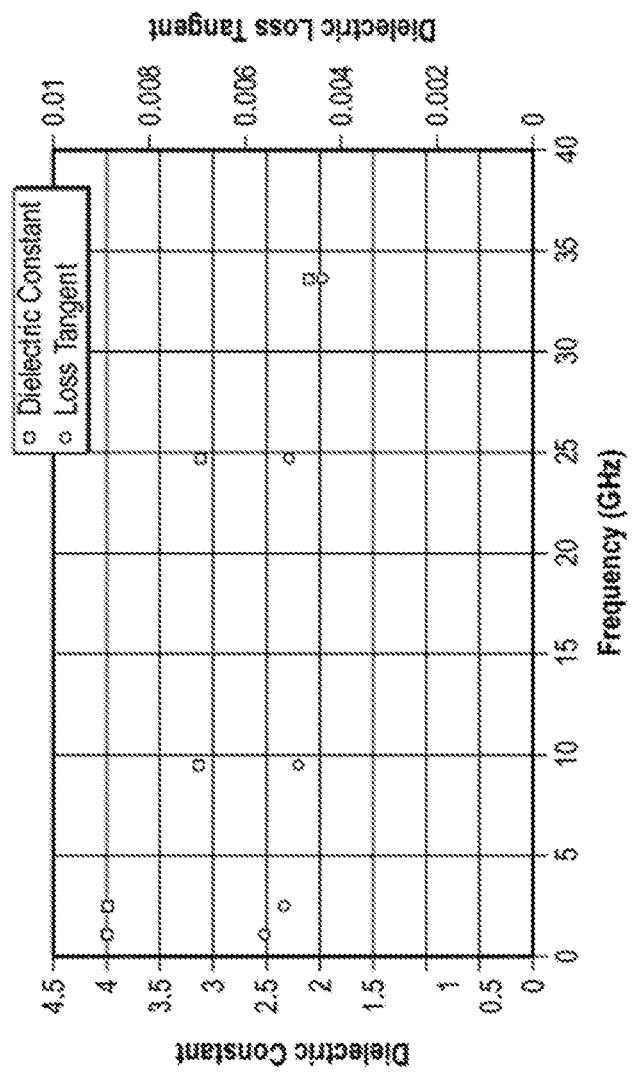
FIG. 10 is a plot of the real part of the dielectric constant and the dielectric loss tangent as a function of frequency for a multilayer optical film, according to some embodiments.

Dielectric properties of the multilayer optical film were determined using the split post dielectric resonance cavity method. FIG. 10 is a plot of the real part of the dielectric constant and the dielectric loss tangent (tan delta) of a multilayer optical film as a function of frequency, according to some embodiments. The IEC 61189-2-721 test standard, for example, can be used to determine dielectric properties in the frequency range of 1 GHz to 33 GHz.

The data shown in FIGS. 9-10 are for a film made generally as described for Example 2 of International Appl. Pub. No. WO 2020/053832 (Fabick et al.).

In some embodiments, for at least one frequency in a range of about 0.1 GHz to about 160 GHz and for substantially normally incident radiation, the optical film transmits at least about 95%, or at least about 97%, or at least about 98%, or at least about 99% of the incident radiation. In some such embodiments, or in other embodiments, for at least one frequency in a range of about 0.1 GHz to about 160 GHz and for substantially normally incident radiation, the optical film reflects less than about 5%, or less than about 2%, or less than about 1% of the incident radiation. In some such embodiments, or in other embodiments, for at least one frequency in a range of about 0.1 GHz to about 160 GHz and for substantially normally incident radiation, a dielectric loss tangent of the optical film is less than about 0.02, or less than about 0.01, or less than about 0.008, or less than about 0.006. In some such embodiments, or in other embodiments, for at least one frequency in a range of about 0.1 GHz to about 160 GHz, a real part of a dielectric constant of the optical film is no more than about 4, or no more than about 3.5, or no more than about 3.2. The real part of the dielectric constant can be at least about 1.5, or at least about 1.8, or at least about 2, for example. The real part of the dielectric constant may also be referred to as the relative permittivity. The at least one frequency referred to for any of these properties may include the same frequency or frequencies as the at least one frequency referred to for any other of these the properties. For example, the at least one frequency can include the predetermined operating frequency f. The range of about 0.1 GHz to about 160 GHz may alternatively be a range of about 1 GHz to about 120 GHz or to about 90 GHz, for example, or may be any range described elsewhere herein for the first frequency range. For example, in some embodiments, for at least one frequency in a range of about 0.1 GHz to about 160 GHz, and/or for at least one frequency in the first frequency range, and/or for the predetermined operating frequency, a dielectric loss tangent of the multilayer optical film is less than about 0.02 and a real part of a dielectric constant of the multilayer optical film is in a range of about 1.8 to about 4. Having a low loss tangent (e.g., less than about 0.02) may be desired so that any dielectric loss is low. Having a real part of a dielectric constant in a range of about 1.8 to about 4, for example, may be desired for low reflection at interfaces with adjacent layers that may have a similar dielectric constant, for example.

Figure 11:
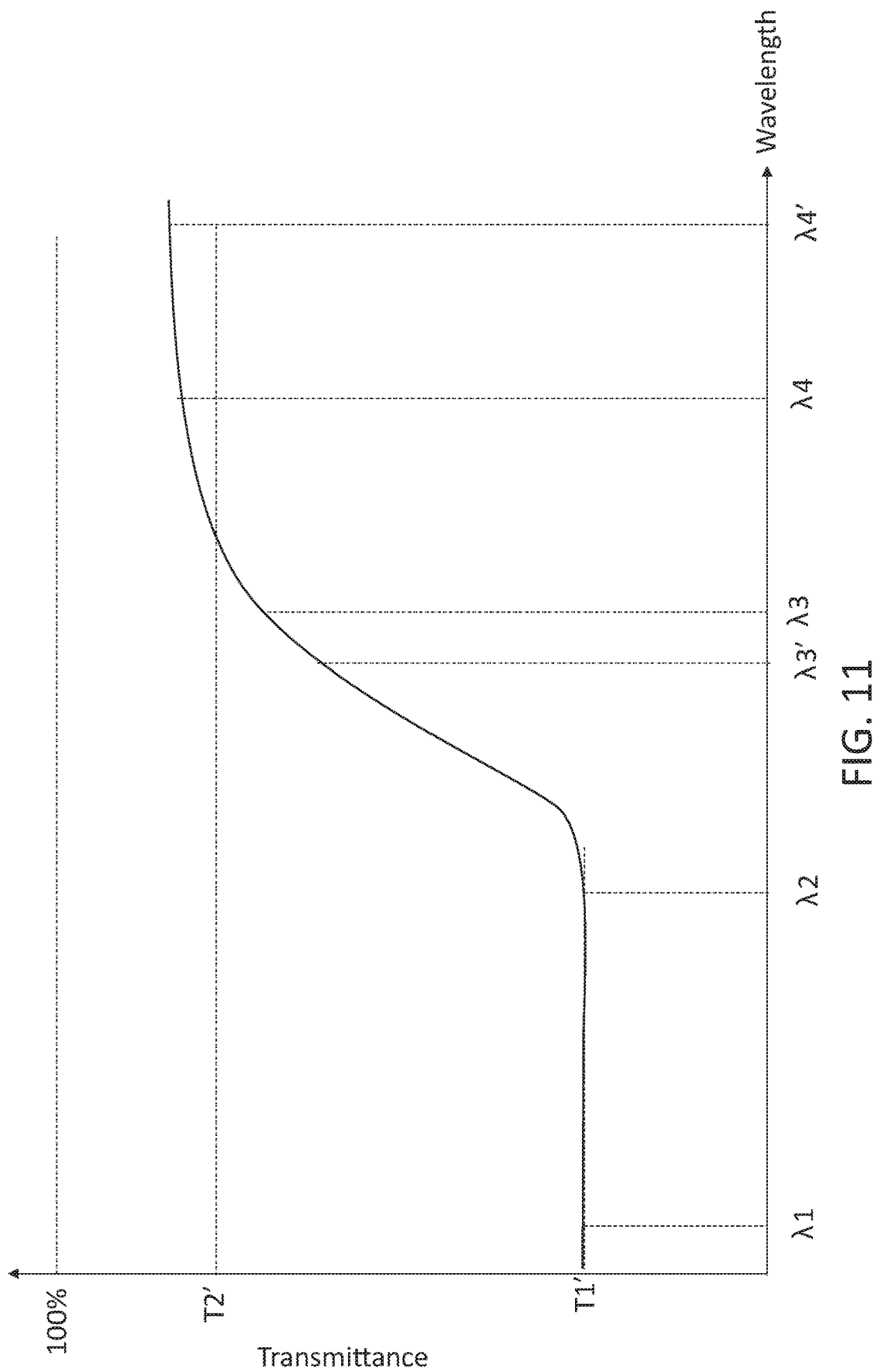
FIG. 11 is a schematic plot of optical transmittance for an optically absorptive layer, according to some embodiments.

FIG. 11 is a schematic plot of optical transmittance for an optically absorptive layer 115, 115', according to some embodiments. In some embodiments, the optically absorbing layer has an average optical transmittance T1' in the first wavelength range for substantially normally incident light and for the at least one polarization state of about 10% to about 90%. In some such embodiments, or in other embodiments, the optically absorbing layer 115, 115' can have an average optical transmittance in the first wavelength range for substantially normally incident light and for the at least one polarization state of less than about 30% or less than about 20%. In some such embodiments, or in other embodiments, the optically absorbing layer 115, 115' can have an average optical transmittance T2' in the second wavelength range for substantially normally incident light and for the at least one polarization state of about 10% to about 90% or to about 95%. In some such embodiments, or in other embodiments, the optically absorbing layer has an average optical transmittance in the second wavelength range for substantially normally incident light and for the at least one polarization state of at least about 70% or at least about 80%.

Figure 12:
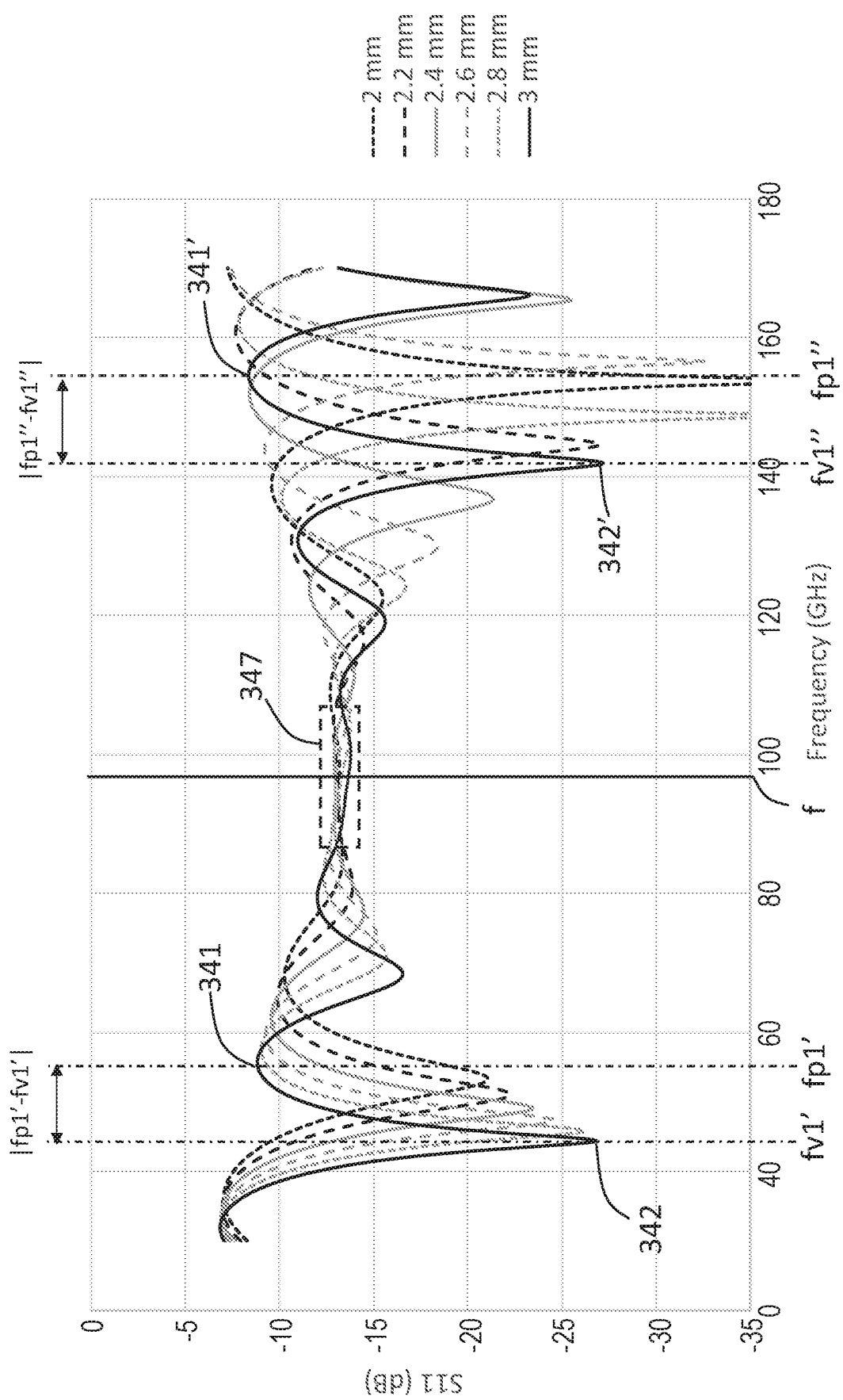
FIGS. 12-13 are plots of return loss as a function of frequency for radiation substantially normally incident on a radio-wave anti-reflection sheet of an optical stack, according to some embodiments.
Figure 13:
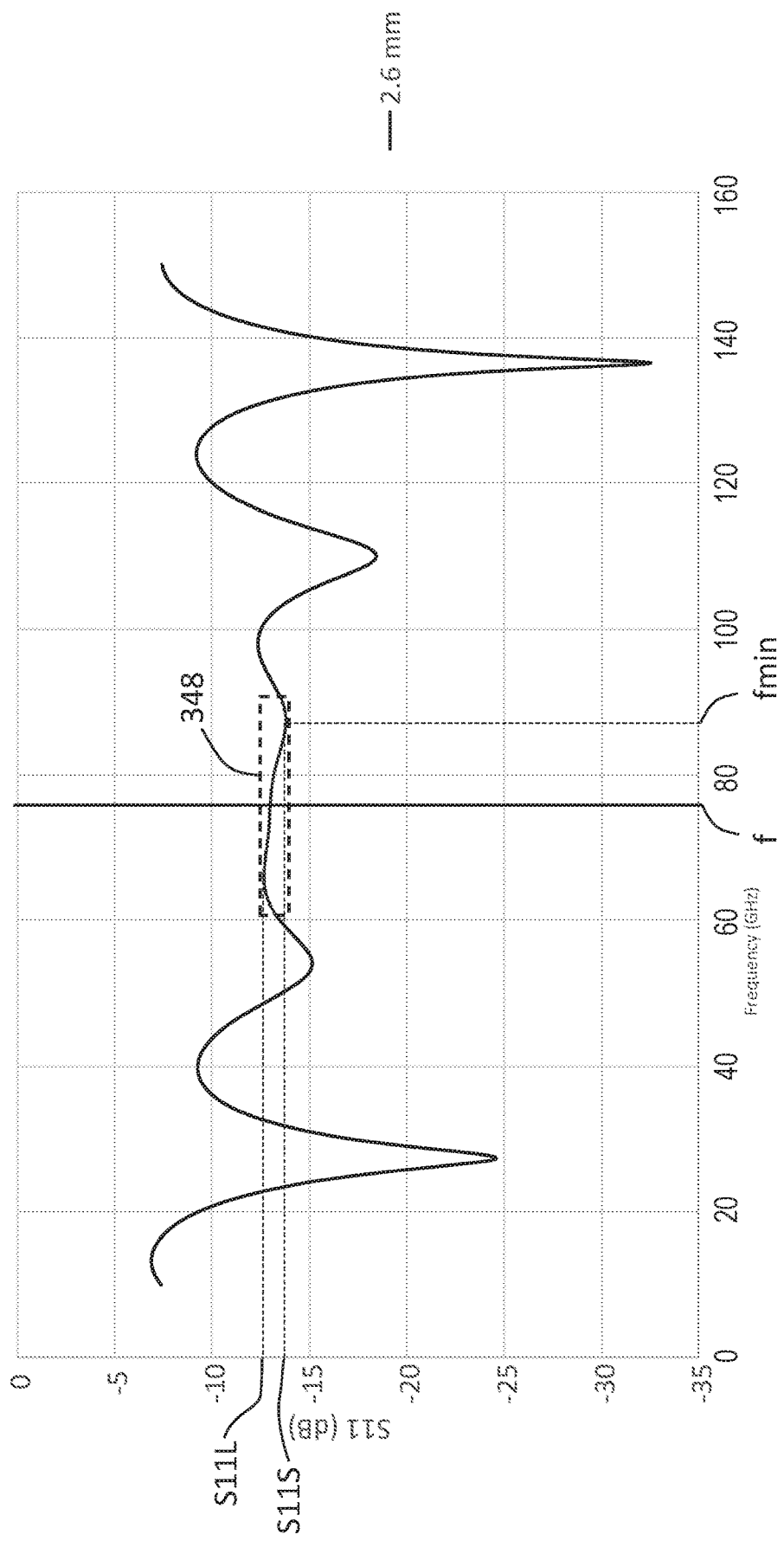

FIGS. 12-13 are plots of return loss (magnitude of S11) as a function of frequency for radiation 155 substantially normally incident on the radio-wave anti-reflection sheet 130 such that at least a portion of the radiation is transmitted through each of the radio-wave anti-reflection sheet 130, the multilayer optical film 120, 120', 120", and the substrate 110, according to some embodiments. It is typically desired to provide a flat region of reduced return loss (e.g., a return loss of less than −10 dB that is within a 2 dB range) in a frequency range (e.g., a frequency range that is at least 20 GHz wide or that is wider than a peak to valley separation in adjacent wavelength ranges) about the predetermined operating frequency f. Having a return loss of less than −10 dB, for example, provides improved functioning of the radar device 209 since reflections that would have otherwise interfered with the functioning are reduced. Having the return loss be flat can ensure that the return loss remain low even when contaminates such as ice or dirt or debris, for example, builds up on a surface of the optical stack, for example. The frequency range is typically somewhere between about 1 GHz and about 120 GHz since many radar devices operate in this range. In FIG. 12, a region 347 of the plot illustrating a 2 dB range of return loss and a 20 GHz frequency range centered on the predetermined frequency f is illustrated. In FIG. 12, a region 348 of the plot illustrating a 1.5 dB range of return loss and a 30 GHz frequency range centered on the predetermined frequency f is illustrated. The return losses of FIGS. 12-13 were calculated for a predetermined operating frequency f of 77 GHz and for the optical stack including only the substrate 110, the multilayer optical film 120, and the radio-wave anti-reflection sheet 130. The substrate 110 was modeled as having a relative permittivity of 2.8 at the predetermined operating frequency f and a thickness that varied in 0.2 mm increments from 2 mm to 3 mm. The first and second layers 131 and 132 were modeled as having respective relative permittivities of 1.29 and 2.16 at the predetermined operating frequency f and respective thicknesses of 0.856 mm and 0.662 mm. In the embodiments of FIGS. 12-13, the thicknesses and relative permittivities of the first and second layers 131 and 132 were chosen to provide an approximately flat return loss in a frequency range about the predetermined operating range.

The thicknesses and relative permittivities of the first and second layers 131 and 132 can generally be selected using standard optical modeling techniques to determine the reflected intensity of radiation reflected the optical stack accounting for constructive and destructive interference of radiation reflecting from the various surfaces and interfaces of the optical stack. As a starting point, the relative permittivity of the first layer 131 can be selected to be approximately the square root of the relative permittivity of the second layer 132 which can be selected to be approximately equal to the square root of the product of the relative permittivity of the first layer 131 and the substrate 110, and the thickness of each of the first and second layers 131 and 132 can selected to be approximately a quarter of the wavelength corresponding to the predetermined operating frequency divided by the square root of the relative permittivity of the layer. The relative permittivities and layer thickness may then be further adjusted from the starting values to reduce the variation in return loss within a wavelength range about the predetermined operating range, for example, based on the standard optical modeling calculations.

In some embodiments, for a first frequency range (e.g., f1 to f2 schematically illustrated in FIG. 1) at least 20 GHz wide, centered on the predetermined operating frequency f, and disposed between about 1 GHz (e.g., corresponding to fa schematically illustrated in FIG. 1) and about 120 GHz (e.g., corresponding to fb schematically illustrated in FIG. 1): a return loss of the optical stack is asymmetric about the predetermined operating frequency in the first frequency range; and the optical stack has a largest return loss S11L in the first frequency range of less than −10 dB and a difference between the largest return loss S11L and a smallest return loss S11S in the first frequency range is less than about 2 dB, or less than about 1.5 dB, or less than about 1.4 dB. The difference may be as small as about 1 dB or about 0.8 dB, for example. The first frequency range may be at least 25 GHz wide, or at least 30 GHz wide, for example, and/or may be wider than frequency differences between peaks and valleys in the return loss in adjacent wavelength ranges. The first frequency range may be up to about 60 GHz, or 50 GHz, or 45 GHz wide for example. The asymmetry may be a result of a tradeoff between having a low return loss at the predetermined operating frequency f and having a flat return loss in the first frequency range (e.g., so that the return loss is robust against contaminate buildup, for example). Similarly, the smallest return loss in the first frequency range may be shifted from the predetermined operating frequency f in order to provide a desired flat return loss. In some embodiments, the smallest return loss S11S occurs at a frequency fmin different from the predetermined operating frequency f by at least about 2, 3, 5, or 7 GHz. |fmin−f| may be up to about half of f2−f1, for example. The largest return loss S11L in the first frequency range may be less than −11 dB, or less than −12 dB, for example, and may be as low as −20 dB, or −15 dB, for example.

The width of the frequency range where the return loss is flat may alternatively, or in addition, be specified in terms of frequency differences between adjacent peaks and valleys in wavelength ranges adjacent to the first wavelength range. Suitable wavelength ranges where the peaks and valleys occur can be about 0.1 f1 to f1 and f2 to about 3 f2, for example. In some embodiments, for a first frequency range from f1 to f2 where $1\ \text{GHz} \le f1 < f2 \le 120\ \text{GHz}$ and where the predetermined operating frequency f is an average of f1 and f2: a return loss of the optical stack is asymmetric about the predetermined operating frequency in the first frequency range; and the optical stack has a largest return loss S11L in the first frequency range of less than −10 dB (or in a range described elsewhere herein) and a difference between the largest return loss S11L and a smallest return loss S11S in the first frequency range is less than about 2 dB, or less than about 1.5 dB, or less than about 1.4 dB. In some embodiments, for each of a second frequency range of about 0.1 f1 (e.g., corresponding to fa schematically illustrated in FIG. 1) to f1 and a third frequency range of f2 to about 3 f2 (e.g., corresponding to fb schematically illustrated in FIG. 1), the return loss of the optical stack includes a least one peak 341, 341' and at least one valley 342, 342'. The peaks 341 and 341' and the valleys 342 and 342' in FIG. 12 are for a substrate thickness of 3 mm. In some embodiments, for each of the second and third frequency ranges, the at least one peak 341, 341' has a first local maximum greater than S11L+2 dB, or greater than S11L+2.5 dB, or greater than S11L+3 dB at a frequency fp1 (denoted fp1' for the second frequency range and fp1" for the third frequency range). The first local maximum may be up to S11L+15 dB, or S11L+10 dB, or S11L+8 dB, for example. In some embodiments, for each of the second and third frequency ranges, the at least one valley 342, 342' has a first local minimum less than S11S−2 dB, or less than S11S−2.5 dB, or less than S11S−3 dB, or less than S11S−3.5 dB, or less than S11S−4 dB at a frequency fv1 (denoted fv1' for the second frequency range and fv1" for the third frequency range). The first local minimum can be as low as S11S−70 dB, or S11S−50 dB, or S11S−30 dB, for example. In some embodiments, for each of the second and third frequency ranges, f2−f1≥|fp1−fv1| (i.e., f2−f1≥|fp1'−fv1'| for the second frequency range and f2−f1≥|fp1"−fv1"| for the third frequency range). In some embodiments, for each of the second and third frequency ranges, f2−f1≥1.5, or 1.6, or 1.7, or 1.8, or 1.9 times|fp1−fv1|, for example. f2−f1 may be up to about 10 or 5 times|fp1−fv1| for each of the first and second frequency ranges, for example. The smallest return loss S11S may occur at a frequency fmin different from the predetermined operating frequency f by at least about 2 GHz or by an amount in a range described elsewhere herein.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description. "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An optical stack comprising:
   a substrate;
   a radio-wave anti-reflection sheet configured to reduce reflection from the optical stack of radio waves emitted from a transmitter at a predetermined operating frequency; and
   a multilayer optical film disposed between the radio-wave anti-reflection sheet and the substrate, such that for light substantially normally incident on the multilayer optical film and for at least one polarization state:
      an average optical reflectance of the multilayer optical film is greater than about 70% in a first wavelength range of about 420 nm to about 680 nm; and
      an average optical transmittance of the multilayer optical film is greater than about 70% in a second wavelength range at least about 100 nm wide and disposed between about 800 nm and about 1600 nm,
   wherein for radiation substantially normally incident on the radio-wave anti-reflection sheet such that at least a portion of the radiation is transmitted through each of the radio-wave anti-reflection sheet, the multilayer optical film, and the substrate; and for a first frequency range at least 20 GHz wide, centered on the predetermined operating frequency, and disposed between about 1 GHz and about 120 GHz:
      a return loss of the optical stack is asymmetric about the predetermined operating frequency in the first frequency range; and
      the optical stack has a largest return loss S11L in the first frequency range of less than −10 dB and a difference between the largest return loss S11L and a smallest return loss S11S in the first frequency range is less than about 2 dB.

2. The optical stack of claim 1, wherein the first frequency range is at least 25 GHz wide.

3. The optical stack of claim 1, wherein the multilayer optical film comprises a plurality of optical repeat units numbering at least 10 in total, each of the optical repeat units comprising at least individual first and second polymeric layers, each of the first and second polymeric layers having an average thickness of less than about 500 nm.

4. The optical stack of claim 1, wherein the radio-wave anti-reflection sheet comprises first and second layers having respective first and second densities, the first density being lower than the second density, the second layer being disposed between the first layer and the multilayer optical film.

5. The optical stack of claim 1, wherein the smallest return loss S11S occurs at a frequency different from the predetermined operating frequency by at least about 2 GHz.

6. The optical stack of claim 1, wherein for at least one frequency in a range of about 1 GHz to about 120 GHz, a dielectric loss tangent of the multilayer optical film is less than about 0.02 and a real part of a dielectric constant of the multilayer optical film is in a range of about 1.8 to about 4.

7. The optical stack of claim 1, wherein for light substantially normally incident on the optical stack and for the at least one polarization state, an average optical transmittance of the optical stack is greater than about 20% in the second wavelength range.

8. The optical stack of claim 1 further comprising a polymeric cover layer disposed between the multilayer optical film and the radio-wave anti-reflection sheet.

9. The optical stack of claim 1 further comprising a heater film disposed between the substrate and the multilayer optical film.

10. A vehicle assembly comprising a transmitter and the optical stack of claim 1 disposed proximate the transmitter, the radio-wave anti-reflection sheet facing the transmitter, the transmitter configured to transmit radio waves at the predetermined operating frequency.

11. An optical stack comprising:
   a substrate;
   a radio-wave anti-reflection sheet configured to reduce reflection from the optical stack of radio waves emitted from a transmitter at a predetermined operating frequency; and
   a multilayer optical film disposed between the radio-wave anti-reflection sheet and the substrate, such that for light substantially normally incident on the multilayer optical film and for at least one polarization state:
      an average optical reflectance of the multilayer optical film is greater than about 70% in a first wavelength range of about 420 nm to about 680 nm; and
      an average optical transmittance of the multilayer optical film is greater than about 70% in a second wavelength range at least about 100 nm wide and disposed between about 800 nm and about 1600 nm,
   wherein for radiation substantially normally incident on the radio-wave anti-reflection sheet such that at least a portion of the radiation is transmitted through each of the radio-wave anti-reflection sheet, the multilayer optical film, and the substrate:
      for a first frequency range from f1 to f2, 1 GHZ≤f1<f2≤120 GHz, the predetermined operating frequency being an average of f1 and f2:
         a return loss of the optical stack is asymmetric about the predetermined operating frequency in the first frequency range; and
         the optical stack has a largest return loss S11L in the first frequency range of less than −10 dB and a difference between the largest return loss S11L and a smallest return loss S11S in the first frequency range is less than about 2 dB; and
      for each of a second frequency range of about 0.1 f1 to f1 and a third frequency range of f2 to about 3 f2, the return loss of the optical stack comprises a least one peak and at least one valley, the at least one peak comprising a first local maximum greater than S11L+2 dB at a frequency fp1, the at least one valley comprising a first local minimum less than S11S−2 dB at a frequency fv1, f2−f1≥|fp1−fv1|.

12. The optical stack of claim 11, wherein for each of the second and third frequency ranges, f2−f1≥1.5|fp1−fv1|.

13. The optical stack of claim 11, wherein the multilayer optical film comprises a plurality of optical repeat units numbering at least 10 in total, each of the optical repeat units comprising at least individual first and second polymeric layers, each of the first and second polymeric layers having an average thickness of less than about 500 nm.

14. The optical stack of claim 11, wherein the radio-wave anti-reflection sheet comprises first and second layers having respective first and second densities, the first density being lower than the second density, the second layer being disposed between the first layer and the multilayer optical film.

15. The optical stack of claim 11, wherein the smallest return loss S11S occurs at a frequency different from the predetermined operating frequency by at least about 2 GHz.

16. The optical stack of claim 11, wherein for at least one frequency in a range of about 1 GHz to about 120 GHz, a dielectric loss tangent of the multilayer optical film is less than about 0.02 and a real part of a dielectric constant of the multilayer optical film is in a range of about 1.8 to about 4.

17. The optical stack of claim 11, wherein for light substantially normally incident on the optical stack and for the at least one polarization state, an average optical transmittance of the optical stack is greater than about 20% in the second wavelength range.

18. The optical stack of claim 11 further comprising a polymeric cover layer disposed between the multilayer optical film and the radio-wave anti-reflection sheet.

19. The optical stack of claim 11 further comprising a heater film disposed between the substrate and the multilayer optical film.

20. A vehicle assembly comprising a transmitter and the optical stack of claim 11 disposed proximate the transmitter, the radio-wave anti-reflection sheet facing the transmitter, the transmitter configured to transmit radio waves at the predetermined operating frequency.

* * * * *

UNITED STATES PATENT AND TRADEMARK OFFICE
CERTIFICATE OF CORRECTION

PATENT NO. : 12,147,066 B2
APPLICATION NO. : 18/567823
DATED : November 19, 2024
INVENTOR(S) : Fan Long et al.

Page 1 of 1

It is certified that error appears in the above-identified patent and that said Letters Patent is hereby corrected as shown below:

In the Claims

Column 16
Line 57, In Claim 11, after "comprises" delete "a least" and insert -- at least --, therefor Column 16
Lines 44 and 45, In Claim 11, delete "1 GHZ $\leq$ f1 < f2 $\leq$ 120 GHz" and insert
-- 1 GHz $\leq$ f1 < f2 $\leq$ 120 GHz --, therefor Signed and Sealed this
Nineteenth Day of August, 2025

Coke Morgan Stewart
*Acting Director of the United States Patent and Trademark Office*